United States Patent

[11] 3,609,520

[72] Inventor Robert C. Sneed, Jr.
Campbell, Calif.
[21] Appl. No. 8,651
[22] Filed Feb. 4, 1970
[45] Patented Sept. 28, 1971
[73] Assignee Varian Associates
Palo Alto, Calif.

[54] BIMODEL CAVITY RESONATOR FOR MICROWAVE SPECTROMETERS
8 Claims, 3 Drawing Figs.

[52] U.S. Cl. .................................................. 324/.5, 333/83
[51] Int. Cl. ................................................ G01n 27/78
[50] Field of Search ........................................ 324/.5, 58, 58.5; 333/246, 83; 330/4, 4.3

[56] References Cited
UNITED STATES PATENTS
3,529,235 9/1970 Day ............................. 324/.5

OTHER REFERENCES
A. M. Portis and Dale Teaney— Microwave Faraday Rotation: Design and Analysis of a Bimodal Cavity— Journal of Applied Physics— 29(12)-Dec. 1958 pp. 1692–1698 Copy in 324-.5 AH.

Primary Examiner—Michael J. Lynch
Attorneys—Stanley Z. Cole and Vincent W. Cleary ABSTRACT: A microwave spectrometer employing a bimodal cavity resonator for electron spin resonance experiments is disclosed. The bimodal cavity includes a shared region of space and an adjacent unshared region of space, such shared region being arranged to support two spatially orthogonal modes of oscillation and the unshared region of space being arranged to support the fields of only one of the modes of oscillation to the exclusion of the other. A set of conductive rods are disposed at the boundary of the adjacent shared and unshared regions, the rods being generally parallel to the magnetic field vector of the mode of oscillation which is common to both the shared and unshared regions and being generally perpendicular to the magnetic field vector of the mode which is to be excluded from the unshared region, whereby spatial orthogonality and positioning of the magnetic field of the two modes within the shared sample volume is enhanced.

INVENTOR.
ROBERT C. SNEED JR.
BY
ATTORNEY

BIMODEL CAVITY RESONATOR FOR MICROWAVE SPECTROMETERS

Heretofore, microwave spectrometers have been disclosed which employed a bimodal cavity resonator for exciting microwave resonance of a sample of matter under investigation. The bimodal cavity resonator included a shared and an unshared region of space, such shared region being at least partially occupied by the sample and containing first and second resonant modes of oscillation of the cavity which were spatially orthogonal to each other. The first mode occupied a region of space common to both the share and the unshared regions of the cavity while the second mode was excluded from the unshared region. Such a cavity and spectrometer is disclosed in copending U.S. application 650,891, filed July 3, 1967 and assigned to the same assignee as the present invention. The advantage of such a bimodal cavity is that tuning of the first resonant mode of oscillation may be achieved in the unshared region containing the first mode to the exclusion of the second mode without interfering with or producing cross talk with the second orthogonal mode which is excluded from the unshared tuning region.

The unshared region of the cavity was typically a section of rectangular waveguide opening into a larger bimodal cavity. The problem with this arrangement is that the mouth of the unshared rectangular waveguide provided a relatively large opening allowing some of the magnetic fields of the second mode, which was to be excluded from the unshared region, to bulge into the unshared rectangular waveguide region of the cavity. This tended to distort symmetry of the fields of the second mode and tended to move the region of maximum magnetic field vector for the second mode out of the center of the sample volume and to consequently move a slight amount of electrical field of the second mode into the sample region. This electric field coupling to the sample, with lossy samples, tended to lower the Q for the second resonant mode and, thus, to reduce the sensitivity of the spectrometer.

SUMMARY OF THE PRESENT INVENTION

The principal object of the present invention is the provision of an improved bimodal cavity resonator for microwave spectrometers.

One feature of the present invention is the provision of a bimodal cavity resonator capable of supporting two spatially orthogonal resonant modes of oscillation and having a region of space shared by the two modes and a region of space occupied by only one of the modes to the exclusion of the other and including a set of elongated electrical conductors extending across the cavity from one wall thereof to the opposed wall at the boundary of the shared and unshared regions for preventing substantial bulging of the magnetic field of the mode to be excluded into the unshared region, whereby improved spatial orthogonality and improved positioning of the magnetic fields of the two resonant modes within the sample volume is obtained.

Another feature of the present invention is the same as the preceding feature wherein the bimodal cavity is formed by first and second intersecting rectangular waveguides arranged in a generally cross-shape and each of which is shorted at opposite ends, such waveguides being arranged such that the longitudinal axis of the first waveguide section is oriented perpendicular to the broad face of the second waveguide with the broad walls of the first guide being parallel to the longitudinal axis of the second guide.

Another feature of the present invention is the same as the preceding feature including the provision of a pair of ganged tuning members with one tuning member being disposed in each of a pair of unshared regions of one of the waveguides, whereby one of the resonant modes is tunable relative to the other without introducing asymmetries in the magnetic field of the tuned mode within the shared region of the cavity.

Another feature of the present invention is the same as any one or more preceding features wherein the walls of the bimodal cavity structure in the unshared region are separated along center planes parallel to the electric field vector in the unshared resonator regions, whereby eddy currents generated by external field modulation are inhibited to facilitate magnetic field penetration of the cavity during field modulation.

Another feature of the present invention is the same as any one or more of the preceding features including the provision of an optically transparent window in one end wall of an unshared region of the cavity, such transparent window facing the shared region of space for transmission of optical radiation through the wall of the cavity to the sample region.

Other features and advantages of the present invention will become apparent upon a perusal of the following specification taken in connection with the accompanying drawings wherein:

DESCRIPTION OF THE PREFERRED EMBODIMENTS

Figure 1:
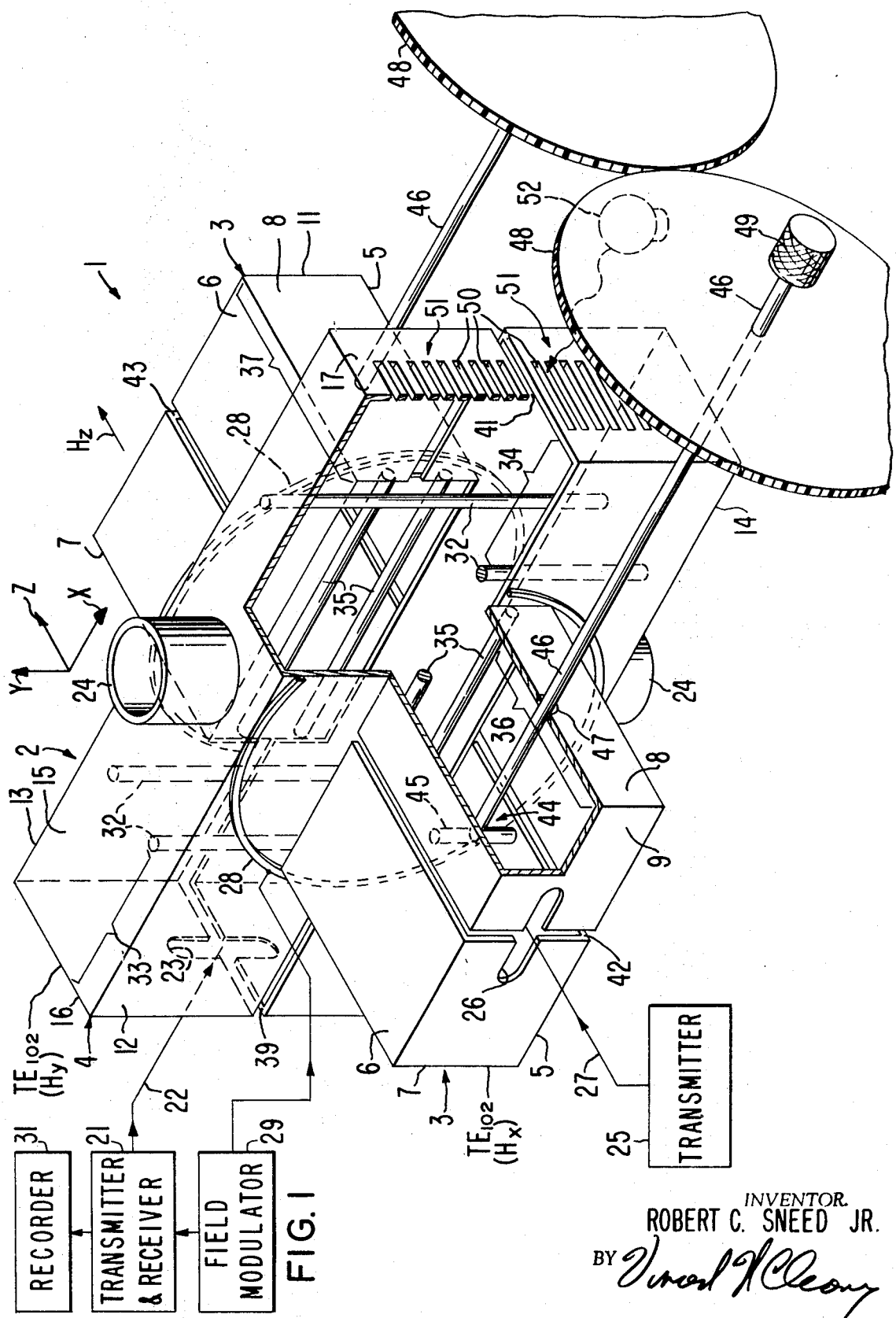
FIG. 1 is a perspective view, partly in block diagram form, of a spectrometer employing a bimodal microwave cavity resonator incorporating features of the present invention.

Referring now to FIG. 1, there is shown a microwave gyromagnetic resonance spectrometer 1 incorporating features of the present invention. The spectrometer 1 includes a bimodal cavity resonator structure 2, as of copper or silver plated brass, immersed in a relatively strong DC polarizing magnetic field $H_z$ directed in the Z direction.

The bimodal cavity 2 includes first and second intersecting rectangular waveguide structures 3 and 4, respectively, to define a generally cross-shaped composite cavity configuration. More specifically, the first waveguide structure 3 includes a pair of broad walls 5 and 6 interconnected by a pair of narrow sidewalls 7 and 8. The opposite ends of the waveguide section 3 are closed off by conductive end walls 9 and 11, respectively.

The second rectangular waveguide section 4 includes a pair of broad walls 12 and 13 interconnected by a pair of narrow sidewalls 14 and 15. The opposite ends of the waveguide 4 are closed off by end walls 16 and 17.

Waveguide 3 intersects the second waveguide 4 at the broad faces 12 and 13 of the second waveguide structure 4, with the central longitudinal axes of waveguides 3 and 4 intersecting at substantially orthogonal angles and with the plane of the broad walls 5 and 6 of the first waveguide 3 being generally parallel to the longitudinal axis of waveguide 4. The broad walls 5 and 6 of the first waveguide 3 are perpendicular to the broad walls 12 and 13 of the second waveguide 4. The first waveguide 3 as such does not extend physically through the second waveguide 4 but merely is joined, as by brazing, to the broad walls 12 and 13 at the rectangular lip portions of the open mouths of the sections of waveguide 3 extending on opposite sides of the second waveguide structure 4.

The second waveguide structure 4 is dimensioned to have a resonant frequency for the $TE_{102}$ mode at the operating frequency of a transmitter-receiver 21 which supplies microwave energy to waveguide structure 4 via a waveguide 22 and iris 23 for exciting the $TE_{102}$ mode therein, The $TE_{102}$ mode has a region of strong uniform magnetic field $H_Y$ in the Y direction at the center of the waveguide structure 4. A sample of matter under investigation, not shown, is inserted into the center of waveguide structure 4 via a pair of short sections of cylindrical waveguide 24 dimensioned to be cut off at the operating frequency of the spectrometer, such cylindrical waveguide 24 having longitudinal axes perpendicular to the narrow walls 14 and 15 and intersecting with the center of the second waveguide structure 4. The sample of matter is inserted through the cutoff waveguide 24 such that it lies substantially on the center line of the cutoff waveguide sections 24 and is disposed in the center of waveguide structure 4. The microwave magnetic field component $H_y$ of the second mode which is disposed in second waveguide structure 4 is perpendicular to the DC polarizing magnetic field $H_z$ and when at the gyromagnetic resonance frequency of the gyromagnetic bodies, such as electrons, within the sample, gyromagnetic resonance of the sample will be excited. The second waveguide structure 4 is part of a microwave bridge, not shown, such that absorption of energy by or reflection of energy from the resonant sample in the resonant waveguide structure 4 produces an unbalance of the bridge resulting in an output signal in the receiver portion of the transmitter-receiver 21.

The first waveguide structure 3 is dimensioned to be resonant in the $TE_{102}$ mode and is tunable over a band of frequencies encompassing the spectral lines of the sample under analysis. A microwave transmitter 25 supplies microwave energy to the first waveguide structure 3 via transmission line 27 and iris 21. The transmitter 25 is tunable in concert with the tunable waveguide 3 to excite the $TE_{102}$ mode in the first resonant waveguide structure 3, and to produce a $TE_{102}$ magnetic vector $H_x$ in the sample for spin decoupling resonance lines of the sample from the observed resonance line. A pair of field modulation Helmholtz coils 28 are wound around the waveguide structure 4 for modulating the $H_z$ polarizing magnetic field component at a suitable modulation frequency, such as 100 kHz. The field modulation produces a similar modulation of the resonance of the gyromagnetic bodies and a sample of the field modulation signal is fed to the receiver portion of the transmitter-receiver 21 for phase detection against the modulation superimposed on the observed resonance signal to derive DC resonance signal which is fed to a recorder 31 for recording as a function of time or of a very low frequency sweep signal which sweeps the polarizing magnetic field intensity $H_z$ at a very slow rate to obtain an electron spin resonance spectrum of the sample. In a typical example of the present invention, the transmitter-receiver microwave energy is of a frequency as of 9.3 gigaHertz in a DC polarizing field $H_z$ on the order of 3,350 gauss. In an alternative mode of operation of the spectrometer 1, the transmitter-receiver frequency is set to resonance on one of the electron resonance lines of the sample at a fixed value of the DC polarizing magnetic field intensity. The spin decoupling frequency of the second transmitter 25 is swept through resonance of the nonobserved resonance lines of the sample. The power level of the second transmitter is set to obtain saturated resonance of the lines of the sample to obtain spin decoupling of successive resonance lines from the observed resonance line, thereby obtaining a spectrum output signal from the sample. In a typical example the spin decoupling power level is 10 times the power level of the observing transmitter 21.

In the spectrometer 1, it is especially desirable that the bimodal cavity be arranged in such a manner that microwave energy from the second transmitter 25 does not cross couple via the cavity 2 into the receiver portion of the transmitter-receiver 21. In other words, the cavity 2 should decouple the spin decoupling energy of the second transmitter from the receiver portion 21 such that the only signal that the receiver portion of the transmitter-receiver 21 picks up is the observed resonance signal. Reduction of cross coupling between the spin decoupling transmitter 25 and the receiver 21 is facilitated by assuring that the second resonance mode in the second waveguide section 4 is spatially orthogonal to the first resonance mode of the cavity 2 in the first waveguide structure 3. However, each waveguide structure 3 and 4 must include a common shared region occupied by the sample.

According to one feature of the present invention, mode fences are provided inside the bimodal cavity structure 2 for fencing off the shared and unshared regions of the cavity 2. More specifically, a first mode fence is formed by two sets of parallel conductive rods 32 extending across the second waveguide section 4 from one narrow wall 15 to the opposed narrow wall 14, such rods 32 being disposed substantially in the planes of the narrow walls 7 and 8 of the first waveguide structure 3 and being generally perpendicular to the magnetic field vector of the excited $TE_{102}$ mode within the first waveguide structure 3 such that the magnetic fields of the first resonant $TE_{102}$ mode in the first waveguide structure 3 do not bulge into adjacent unshared end regions 33 and 34 of the second waveguide structure 4 which end sections are not to be shared with the $TE_{102}$ mode in waveguide structure 3.

Likewise, two additional sets of two conductive rods 35 each extend across the mouths of the first waveguide structure 3 where the first waveguide structures intersect the second waveguide structure 4. Rods 35 are parallel to each other and extend from one narrow wall 7 to the opposed narrow wall 8 and are parallel to the broad walls 5 and 6 of the first waveguide structure 3. Rods 35 are also perpendicular to the relatively strong magnetic field lines $H_y$ of the second resonant $TE_{102}$ mode in the second waveguide structure 4. Thus, rods 35 prevent bulging of the magnetic field of the second resonant $TE_{102}$ mode in the second waveguide structure 4 into the unshared outer end portions 36 and 37 of the first waveguide structure 3. Thus, the two sets of rods 32 and 35, disposed at the boundaries between the shared and unshared regions of the bimodal cavity 2, serve to assure the orthogonality of the two resonant modes in the shared region and, in addition, prevent bulging of the modes into the unshared regions of the cavity 2 from which they are to be excluded.

The mode fences 35 and 32 permit the two waveguide structures 3 and 4 to be passed through each other to form the cross-shaped composite cavity 2 while maintaining relatively high $Q_z$ for each of the orthogonal cavity portions. The $Q_z$ would be substantially lower if it were not for the mode fences 35 and 32.

The unshared regions 33, 34 and 36, 37 of the respective waveguide structures 4 and 8, respectively, are separated by slots 39, 41 and 42, 43, respectively, for inhibiting the flow of eddy currents tending to be induced in the walls of the cavity 2 via the time varying external modulation magnetic field produced by Helmholtz coils 28. The slots 39–43 pass through the walls of the waveguide sections 3 and 4 in a plane perpendicular to the broad walls and containing the center line of the first and second waveguide sections 3 and 4, respectively.

Generally, it is desirable that the $TE_{102}$ mode in the first waveguide section 3 which is coupled to the spin decoupling transmitter 25 be separately tunable relative to the second $TE_{102}$ mode which is employed for observing resonance of the sample in the second waveguide structure 4. For this purpose a tuner 44 (See FIGS. 1 and 2) is disposed in each of the unshared portions 36 and 37 of the first waveguide structure 3. Each tuner structure 44 includes a conductive rod 45, as of silver plated brass, mounted on a conductive shaft 46, extending as of silver plated brass, from the tuning member 45 outwardly of the resonator 3 along the direction perpendicular to the narrow walls 8 of waveguide structure 3. The conductive shafts 46 pass through nonelectrically contacting bearings 47 at the waveguide walls 8 and each includes a gear 48 which engages the gear 48 on the other shaft 46. One of the tuning shafts 46 is extended to a tuning knob 49 such that by rotation of the tuning knob 49, the motion of the tuners 45 within the waveguide structure 3 is ganged to produce symmetrical movement of the tuning members 45 within the tuned first waveguide structure 3 such as not to perturb the symmetry of the tuned resonant $TE_{102}$ mode in the first waveguide 3 or in the shared region of the cavity 2. The tuning members 45 are located on the longitudinal axis of the first waveguide sections 3 for rotation is a plane perpendicular to the broad walls 5 and 6. When the tuning member 45 is directed parallel to the Y direction maximum capacitive tuning effect is obtained and when it is rotated to a 90° position parallel to the broad walls 5 and 6, a minimum capacitive tuning effect is obtained. The spin decoupling transmitter 25 includes a bridge circuit with the tunable waveguide 3 forming one arm of the bridge. An automatic frequency control circuit locks the frequency of the spin decoupling transmitter 25 to the tuned frequency of the waveguide 3, and a servomotor coupled to the tuning knob 49 sweeps the frequency of the resonant waveguide 3 and the tracking spin decoupling transmitter 25 through successive resonances of the various lines of the sample. Symmetrical movement of the tuning members 45 prevents frequency dependent cross coupling from the spin decoupling transmitter 25 into the observing receiver portion of the transmitter-receiver 21.

An optically transparent window structure 51 is disposed in end wall 17 of waveguide structure 4. The window 51 comprises a closely spaced array of find conductive strips 50 lying substantially in the plane of end wall 17 and being parallel to each other and generally perpendicular to the magnetic field vector for the second $TE_{102}$ mode in the second waveguide structure 4 to appear as a short circuit and as a continuation of end wall 17 to that mode. The spacing between conductors is on the order of the width of the conductors to provide on the order of 50 percent transparency to optical radiation which may be emanating from the sample region or which may be transmitted through the window 51 from a light source 52 to the sample.

Figure 2:
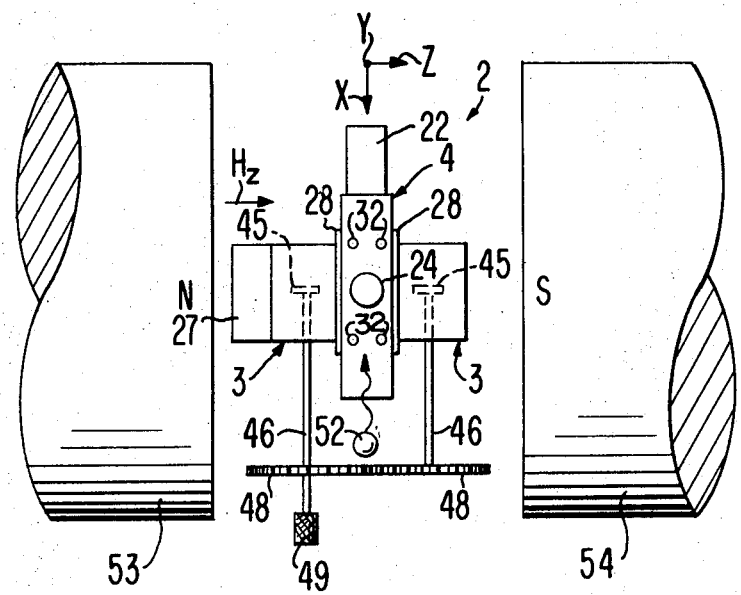
FIG. 2 is a schematic line diagram, in plan view, depicting the bimodal cavity of FIG. 1 as disposed in the gap of a magnet.

Referring now to FIG. 2, there is shown the bimodal cavity 2 of FIG. 1 as mounted in the magnetic gap between a pair of opposed parallel pole pieces 53 and 54 of a powerful magnet. The diagram shows the orientation of the waveguide sections 22 and 27 interconnecting the cavity 2 with the transmitter-receiver 21 and spin decoupling transmitter 25, respectively. A bimodal cavity 2 dimensioned for operation at the aforecited 9.3 gigaHertz, with waveguides 3 and 4, 22 and 27 oriented as shown in FIGS. 1 and 2, is readily accommodated within a 2⅝ inch gap between the pole faces of pole pieces 53 and 54.

Figure 3:
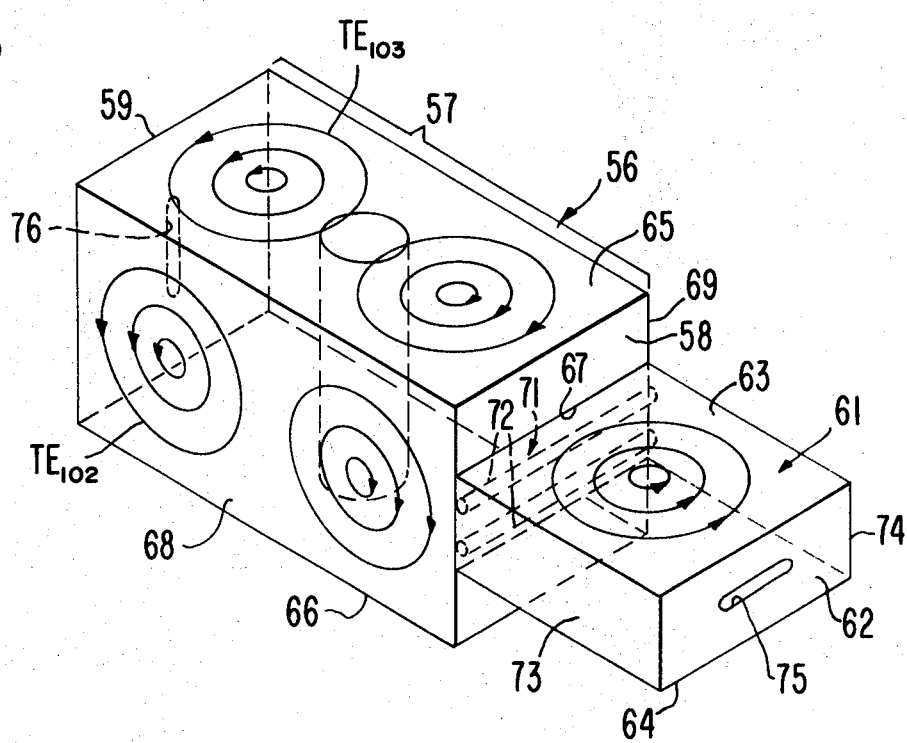
FIG. 3 is a simplified perspective line diagram depicting an alternative bimodal cavity incorporating features of the present invention.

Referring now to FIG. 3, there is shown an alternative bimodal cavity configuration of the present invention. Bimodal cavity 56 includes a shared region 57 defined by a length of waveguide of generally square cross section shorted at its ends by end walls 58 and 59, respectively. A sample volume of space is contained within the center of the shared region 57. End wall 58 is joined to the open end of a section of rectangular waveguide 61 closed on its outer end via end wall 62. Waveguide section 61 is disposed with a pair of its broad walls 63 and 64 parallel to a similar set of broad walls 65 and 66 of the shared portion 57 of the resonator 56. End wall 58 includes a rectangular opening 67 in registration with the lip at the mouth of waveguide 61 where it joins waveguide wall 58.

The shared region 57 of the cavity 56 is dimensioned to support the $TE_{102}$ mode with its H field parallel to the plane of sidewalls 68 and 69 of the resonator 56. Waveguide 61 is dimensioned together with shared region 57 to support a resonant $TE_{103}$ mode with the H field parallel to top and bottom walls 65 and 66. A mode fence 71 is disposed at the mouth of waveguide section 61 at the boundary of the shared and unshared regions of the composite resonator 56 to prevent bulging of the $TE_{102}$ mode magnetic fields into the unshared region 61 of the composite bimodal resonator 56.

The mode fence 71 comprises a set of two conductive rods 72 extending across the mouth of waveguide 61 generally parallel to its broad walls 63 and 64 and perpendicular to its narrow walls 73 and 74 and sidewalls 68 and 69 of the resonator 56. In this manner the rods do not appreciably perturb the $TE_{103}$ mode but effectively short the $TE_{102}$ mode at the end wall 58 of the shared region 57 of the resonator 56. Irises 75 and 76 are provided communicating through end walls 59 and 62, respectively, for coupling waveguides 27 and 22, respectively, now shown, to the bimodal cavity 56 in a manner similar to that previously described with regard to FIGS. 1 and 2.

For gyromagnetic resonance samples having relatively high dielectric loss, such as water samples, the sensitivity of the spectrometer can be greatly enhanced if asymmetric field bulging is prevented since such field bulging tends to move some of the electric field of the $TE_{102}$ resonant mode into the sample material, thereby substantially reducing the Q of that resonant mode. For example, the mode fence 71 prevents bulging of the $TE_{103}$ into the unshared region of waveguide 61 and prevents this dielectric loss and in certain lossy samples, such as manganese-ion in water, the mode fence 71 substantially increases the signal-to-noise ratio of the spectrometer.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a microwave spectrometer, bimodal cavity resonator means for supporting first and second spatially orthogonal resonant modes of oscillation therein, said bimodal cavity resonator including a shared region to be partially occupied by a volume of sample material under investigation and such shared region being a region of space shared by fields of both the first and second resonant modes of oscillation, said cavity also including an unshared region of space adjacent said shared region and containing fields of only the first resonant mode of oscillation to the exclusion of the fields of the second resonant mode of oscillation, THE IMPROVEMENT COMPRISING, a set of conductor means extending across said cavity from one wall thereof to an opposed wall thereof at the boundary of said adjacent shared and unsahred regions of said bimodal cavity, and said set of conductor means being elongated and disposed generally parallel to each other with their direction of elongation being generally parallel to the magnetic field vector of said first resonant mode in the unshared region of said cavity and generally perpendicular to the magnetic field vector of said second resonant mode for preventing substantial bulging of the magnetic field of the second resonant mode into the unshared portion of said cavity resonator, whereby improved spatial orthogonality and improved positioning of the magnetic field of said first and second resonant modes within the shared sample volume is obtained.

2. The apparatus of claim 1 wherein said set of conductor means comprises a plurality of conductive rods.

3. The apparatus of claim 1 wherein said bimodal cavity resonator comprises first and second intersecting rectangular waveguide structures, each of said waveguide structures being shorted at the ends, said rectangular waveguide structures each including a pair of broad walls interconnected by a pair of narrow sidewalls and being disposed intersecting at substantially right angles with the broad walls of said first waveguide structure being disposed substantially parallel to the longitudinal axis of said second waveguide structure and with the plane of said broad walls of said first waveguide structure being perpendicular to the plane of the broad walls of said second waveguide structure.

4. The apparatus of claim 3 wherein each of said first and second waveguide structures includes portions extending on opposite sides of the other waveguide structure in the general composite configuration of a cross, and wherein there are first and second sets of said conductor means orthogonally oriented with respect to each other with said first set of conductor means extending across the mouths of said first waveguide at the intersection thereof with said second waveguide, said first set of conductors extending parallel to the broad walls of said first waveguide, and said second set of conductor means extending across said second waveguide structure from one narrow wall thereof to the opposed narrow wall, said second set of conductors being disposed substantially in the planes of the narrow walls of said first waveguide structure, and said second conductor means extending generally parallel to the broad walls of said second waveguide structure.

5. The apparatus of claim 4 wherein said first and second waveguide structures are dimensioned for resonance in the $TE_{102}$ mode for said first and second resonant modes of oscillation, respectively, of said bimodal cavity at the operating frequency of the spectrometer.

6. The apparatus of claim 4 wherein each of said waveguide structures which extends on the opposite side of the other waveguide structure is separated by a slot passing through the broad walls of said waveguide structures in a plane parallel to the narrow walls of the respective waveguide structure and passing through the center line of the respective waveguide structure, and means for applying a time varying magnetic field to the outside of said bimodal cavity, whereby said slots serve to inhibit eddy currents which would otherwise tend to shield the sample region of said cavity from the applied time varying magnetic field.

7. The apparatus of claim 4 including a tuning means movable in each of a pair of unshared regions of said first waveguide structure for tuning the resonant frequency of the first resonant mode of oscillation of said bimodal cavity, and means for ganging the movement of said tuning means such that the magnetic fields of said first resonant mode are perturbed by said tuning means in a symmetrical manner with respect to the center of said first waveguide structure, whereby tuning of said first resonant mode does not disturb symmetry of the magnetic field of said first resonant mode within the sample volume.

8. The apparatus of claim 7 wherein said second waveguide structure includes an optically transparent end wall in an unshared region thereof facing the sample region for transmission of optical radiation therethrough along an unobstructed straight line path which intersects the sample volume within the shared region of said bimodal cavity.